US012688680B2

(12) United States Patent     (10) Patent No.:   US 12,688,680 B2

Cilloni et al.        (45) Date of Patent:     Jul. 21, 2026

(54) IMAGE ANALYTICS USING EMBEDDINGS

(71) Applicant: Cisco Technology, Inc., San Jose, CA (US)

(72) Inventors: Thomas Cilloni, Oxford, MS (US); Charles Fleming, Oxford, MS (US); Ramana Rao V. R. Kompella, Foster City, CA (US); Gaowen Liu, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 262 days.

(21) Appl. No.: 18/519,276

(22) Filed: Nov. 27, 2023

(65) Prior Publication Data

US 2025/0174012 A1     May 29, 2025

(51) Int. Cl.
| | |
|---|---|
| *G06V 10/774* | (2022.01) |
| *G06V 10/94* | (2022.01) |
| *G06V 20/52* | (2022.01) |

(52) U.S. Cl.
CPC .......... *G06V 10/774* (2022.01); *G06V 10/945* (2022.01); *G06V 20/52* (2022.01)

(58) Field of Classification Search
CPC ...... G06V 10/82; G06V 20/56; G06V 10/764; G06V 20/188; G06V 20/70; G06V 10/44; G06V 10/56; G06V 20/20; G06V 20/52; G06V 20/41; G06V 20/64; G06V 10/761; G06V 2201/07; G06V 30/19173; G06V 30/413; G06V 30/416; G06V 10/26; G06V 10/40; G06V 10/454; G06V 10/803; G06V 20/44; G06V 30/19093;

G06V 30/414; G06V 30/42; G06V 10/25; G06V 10/762; G06V 10/7715; G06V 10/774; G06N 3/0464; G06N 3/08; G06N 3/0455; G06N 3/09; G06N 3/045; G06N 3/04; G06N 20/00; G06N 3/084; G06N 3/091; G06N 3/096; G06N 3/047; G06N 3/048; G06N 3/0495; G06N 3/0475; G06N 3/088; G06N 3/044; G06N 3/063; G06N 3/092; G06N 3/094; G06N 5/04
See application file for complete search history.

(56) References Cited

U.S. PATENT DOCUMENTS

| | | | |
|---|---|---|---|
| 10,652,565 B1 * | 5/2020 | Zhang ..................... | G06N 20/00 |
| 2005/0131660 A1 | 6/2005 | Yadegar et al. | |

(Continued)

OTHER PUBLICATIONS

Beaumont R., "Image Embeddings", Medium, Jul. 20, 2020, 22 Pages.

(Continued)

*Primary Examiner* — Alex Kok S Liew

(74) *Attorney, Agent, or Firm* — Lee & Hayes, P.C.

(57) ABSTRACT

In one implementation, a device receives, via a user interface, one or more parameters regarding formation of an embedding of an image. The device forms, in accordance with the one or more parameters, an embedding of the image by inputting it to a machine learning-based encoder model that was trained to maximize a measure of data utility of its output embeddings. The device provides the embedding for use to train an analytics model. The device causes the analytics model to be used to make inferences about embeddings derived from images captured by one or more cameras.

20 Claims, 6 Drawing Sheets

(56) References Cited

U.S. PATENT DOCUMENTS

| | | | |
|---|---|---|---|
| 2019/0057314 A1* | 2/2019 | Julian | .................... H04L 67/34 |
| 2022/0053195 A1 | 2/2022 | Hurwitz et al. | |
| 2022/0067507 A1 | 3/2022 | Li et al. | |

OTHER PUBLICATIONS

Gronne M., "Into Image Embedding and Latent Spaces", Towards Data Science, Medium, Sep. 1, 2022, 15 Pages.

Masson-Forsythe M., "Generate Image Embeddings using a Pre-trained CNN and Store them in Hub", Activeloop, Sep. 20, 2021, 19 Pages.

Pan Z., et al., "Extreme Generative Image Compression by Learning Text Embedding from Diffusion Models", arXiv:2211.07793v1 [eess.IV], A Preprint, Nov. 14, 2022, pp. 1-11.

Tellez D., et al., "Gigapixel Whole-Slide Image Classification using Unsupervised Image Compression and Contrastive Training", 1st Conference on Medical Imaging with Deep Learning (MIDL 2018), Apr. 11, 2018, pp. 1-3.

Tellez D., et al., "Neural Image Compression for Gigapixel Histopathology Image Analysis", arXiv:1811.02840v2 [cs.CV], Apr. 15, 2020, pp. 1-15.

Tripathi R., "What are Vector Embeddings", Pinecone, retrieved on Nov. 16, 2023, 6 Pages.

* cited by examiner

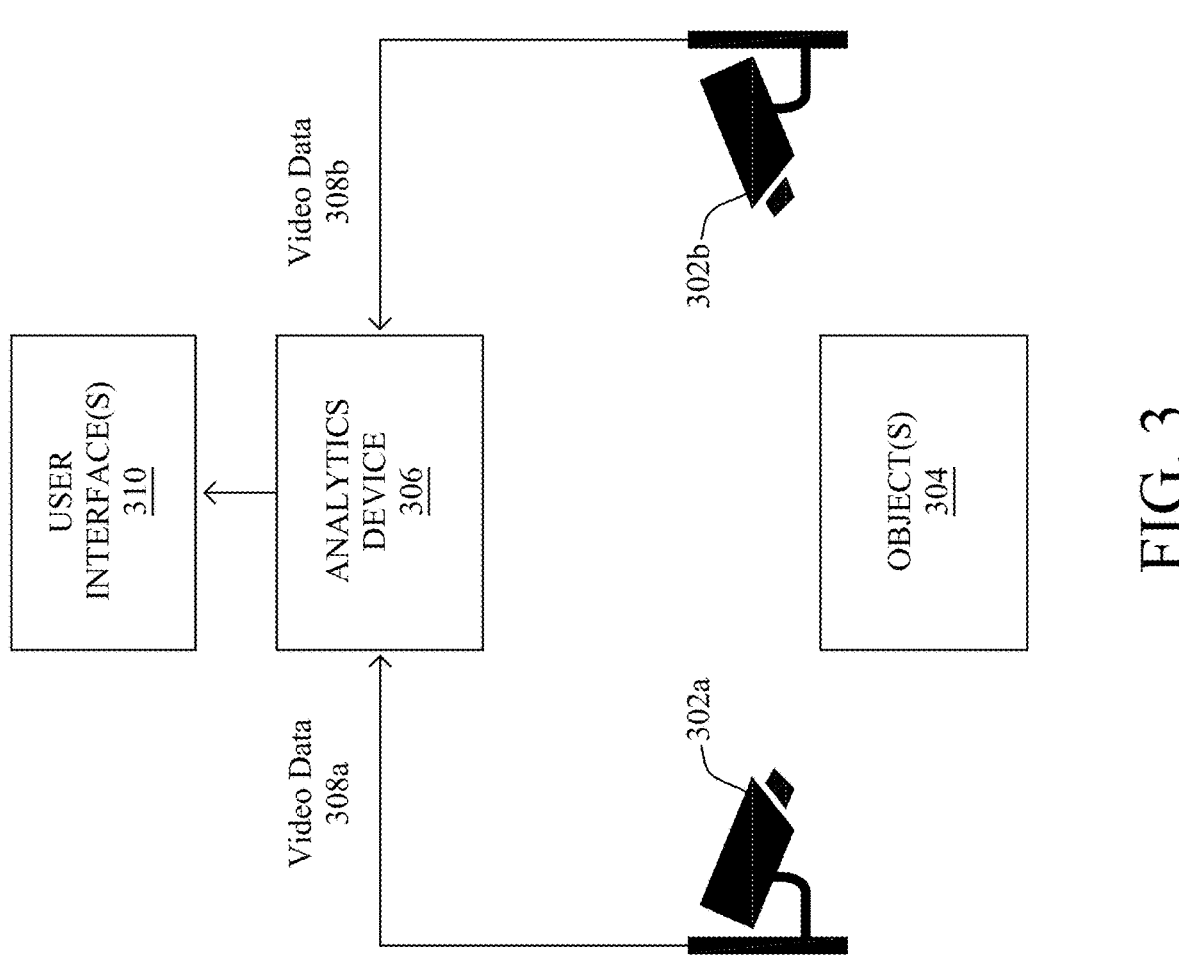
FIG. 3

Model Parameters 502

Model Type: ResNet

Embedding Size: 1024

Precision: 32 bits

Model Weights: default or Choose

Target Parameters 504

Target Type: pickle

☑ Zip Outputs  ☐ Preserve Folders  ☐ One File per Directory

☐ image folder
☐ another image folder
☐ image one.jpg
☐ image two.png
☐ another img.gif
506

Controls 508

Add Source     Set Destination     Start Job

Progress 510

Data Fetch

Encoding

Data Delivery

FIG. 5

IMAGE ANALYTICS USING EMBEDDINGS

TECHNICAL FIELD

The present disclosure relates generally to computer networks, and, more particularly, to image analytics using embeddings.

BACKGROUND s With the advents of machine and deep learning, video analytics systems have grown in both their capabilities, as well as their complexities. One use for such systems exists in the context of multi-camera surveillance systems, to detect people and other objects and make decisions about their behaviors. For instance, a surveillance system in an airport or other sensitive area may seek to detect when a person leaves an object unattended.

The amount of images/video data being generated, stored, and analyzed by such video analytics systems is also increasing at a meteoric rate. This means an increased use of resources ranging from storage resources, computational resources, as well as network resources. For instance, in the case in which the images are analyzed in the cloud, this means that each video stream must be sent for analysis across the Internet, consuming additional bandwidth.

While using an existing compression standard can help to reduce the size of the image/video files, thereby reducing the required resources, these standards all seek to minimize the size of the file while maximizing the visual quality (e.g., JPEG, PNG, TIFF, etc.). In other words, image compression techniques typically aim to produce a decompressed image that is as visually similar to that of the original as possible. However, from a machine learning/video analytics standpoint, doing so can also result in the loss of important information for the model analyzing the image.

BRIEF DESCRIPTION OF THE DRAWINGS

The implementations herein may be better understood by referring to the following description in conjunction with the accompanying drawings in which like reference numerals indicate identically or functionally similar elements, of which:

FIG. 3 illustrates an example system for performing video analytics;

FIG. 5 illustrates an example user interface to control how an embedding is formed from an image.

DESCRIPTION OF EXAMPLE IMPLEMENTATIONS

Overview

Figure 1:
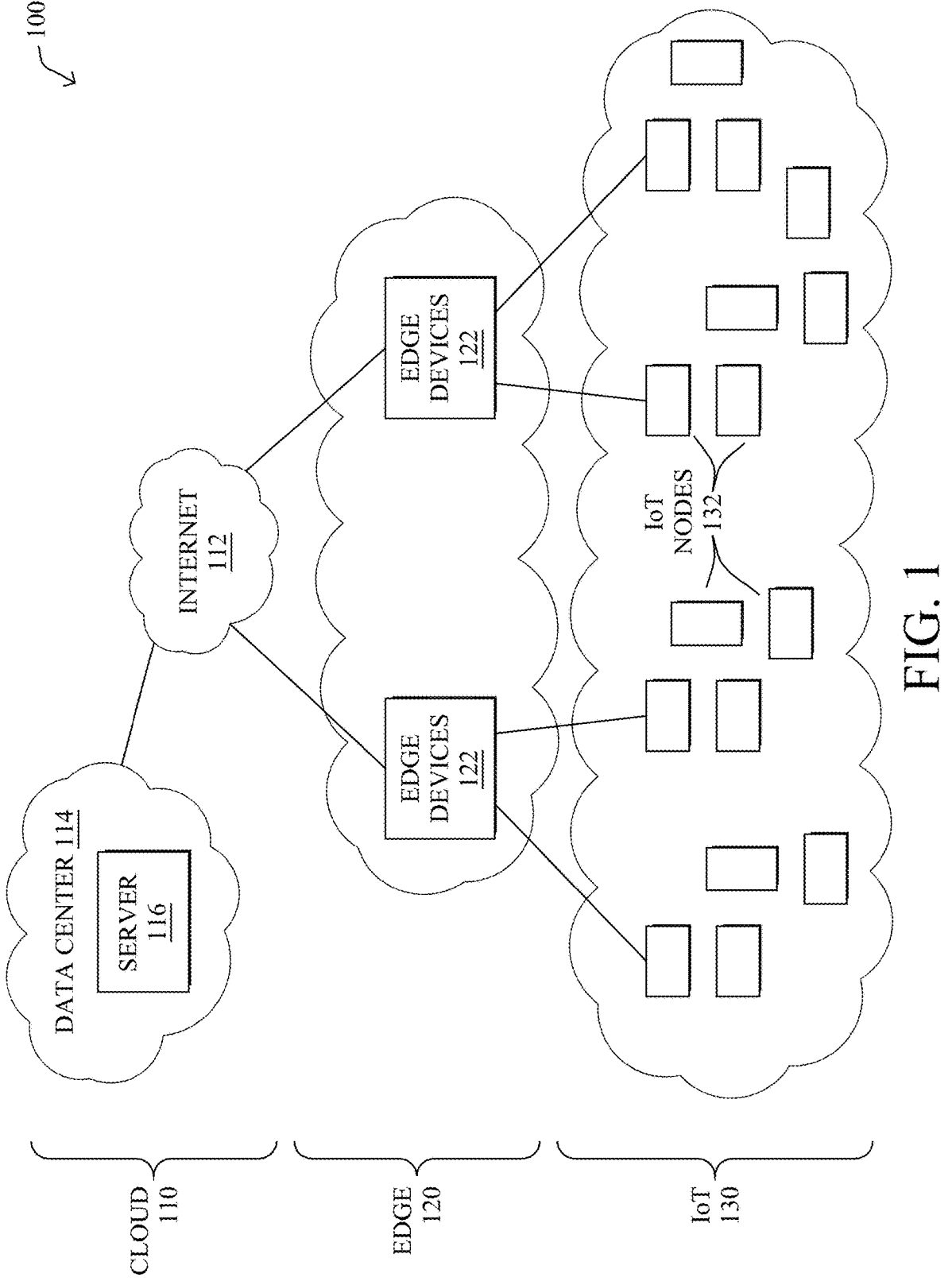
FIG. 1 illustrate an example network.

According to one or more implementations of the disclosure, a device receives, via a user interface, one or more parameters regarding formation of an embedding of an image. The device forms, in accordance with the one or more parameters, an embedding of the image by inputting it to a machine learning-based encoder model that was trained to maximize a measure of data utility of its output embeddings. The device provides the embedding for use to train an analytics model. The device causes the analytics model to be used to make inferences about embeddings derived from images captured by one or more cameras.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. Other types of networks, such as field area networks (FANs), neighborhood area networks (NANs), personal area networks (PANs), etc. may also make up the components of any given computer network.

In various implementations, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or wired networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Edge computing, also sometimes referred to as "fog" computing, is a distributed approach of cloud implementation that acts as an intermediate layer from local networks (e.g., IoT networks) to the cloud (e.g., centralized and/or shared resources, as will be understood by those skilled in the art). That is, generally, edge computing entails using devices at the network edge to provide application services, including computation, networking, and storage, to the local nodes in the network, in contrast to cloud-based approaches that rely on remote data centers/cloud environments for the services. To this end, an edge node is a functional node that is deployed close to IoT endpoints to provide computing, storage, and networking resources and services. Multiple edge nodes organized or configured together form an edge compute system, to implement a particular solution. Edge nodes and edge systems can have the same or complementary capabilities, in various implementations. That is, each individual edge node does not have to implement the entire spectrum of capabilities. Instead, the edge capabilities may be distributed across multiple edge nodes and systems, which may collaborate to help each other to provide the desired services. In other words, an edge system can include any number of virtualized services and/or data stores that are spread across the distributed edge nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

FIG. 1 is a schematic block diagram of an example simplified computer network 100 illustratively comprising nodes/devices at various levels of the network, interconnected by various methods of communication. For instance, the links may be wired links or shared media (e.g., wireless links, wired links, etc.) where certain nodes, such as, e.g., routers, sensors, computers, etc., may be in communication with other devices, e.g., based on connectivity, distance, signal strength, current operational status, location, etc.

Specifically, as shown in the example IoT network 100, three illustrative layers are shown, namely cloud layer 110, edge layer 120, and IoT device layer 130. Illustratively, the cloud layer 110 may comprise general connectivity via the Internet 112, and may contain one or more datacenters 114 with one or more centralized servers 116 or other devices, as will be appreciated by those skilled in the art. Within the edge layer 120, various edge devices 122 may perform various data processing functions locally, as opposed to datacenter/cloud-based servers or on the endpoint IoT nodes 132 themselves of IoT device layer 130. For example, edge devices 122 may include edge routers and/or other networking devices that provide connectivity between cloud layer 110 and IoT device layer 130. Data packets (e.g., traffic and/or messages sent between the devices/nodes) may be exchanged among the nodes/devices of the computer network 100 using predefined network communication protocols such as certain known wired protocols, wireless protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), or other shared-media protocols where appropriate. In this context, a protocol consists of a set of rules defining how the nodes interact with each other.

Figure 2:
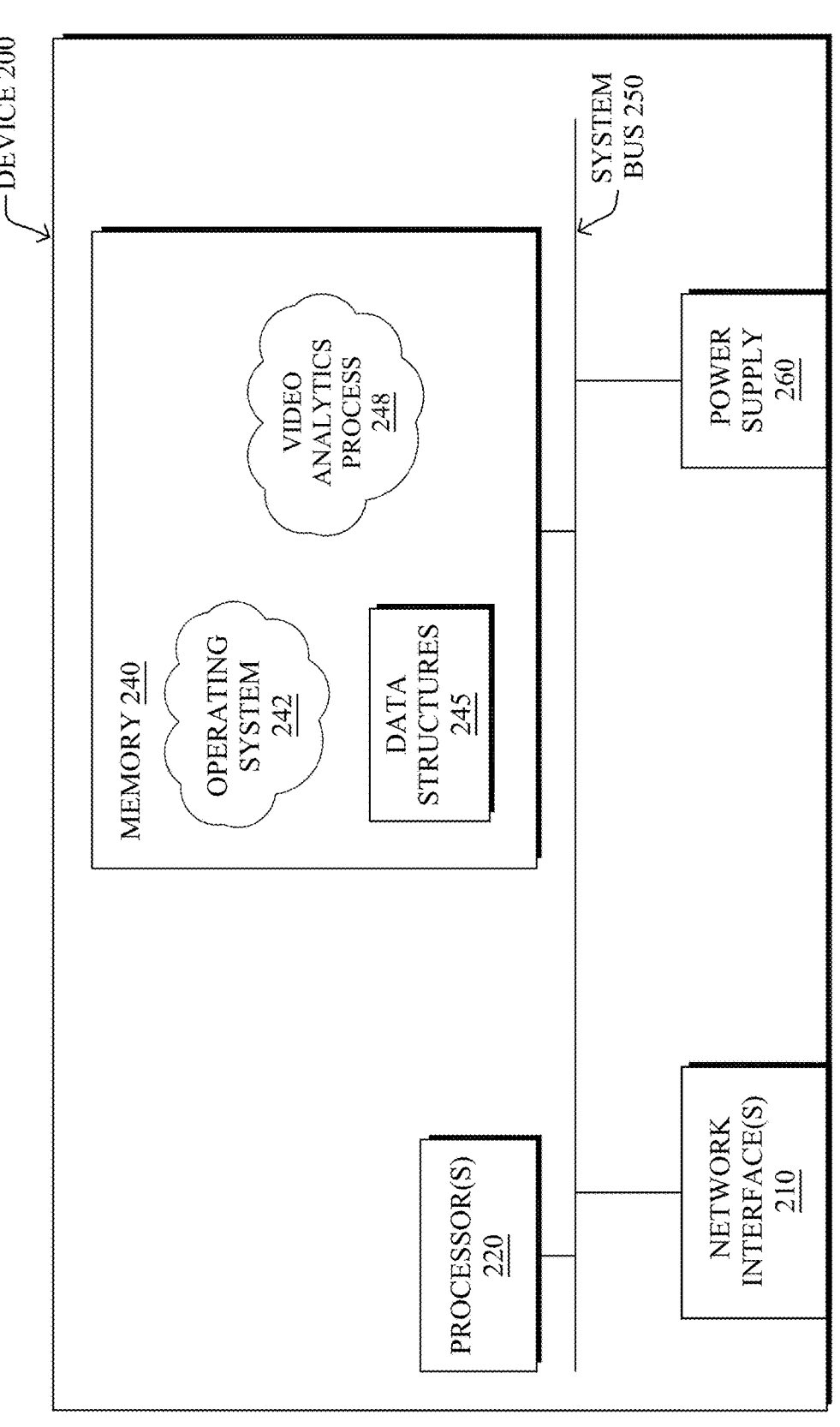
FIG. 2 illustrates an example network device/node.

FIG. 2 is a schematic block diagram of an example node/device 200 (e.g., an apparatus) that may be used with one or more implementations described herein, e.g., as any of the nodes or devices shown in FIG. 1 above or described in further detail below. The device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

Network interface(s) 210 include the mechanical, electrical, and signaling circuitry for communicating data over links coupled to the network. The network interfaces 210 may be configured to transmit and/or receive data using a variety of different communication protocols, such as TCP/IP, UDP, etc. Note that the device 200 may have multiple different types of network connections, e.g., wireless and wired/physical connections, and that the view herein is merely for illustration.

The memory 240 comprises a plurality of storage locations that are addressable by the processor 220 and the network interfaces 210 for storing software programs and data structures associated with the implementations described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes/services may comprise an illustrative video analytics process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

In various implementations, video analytics process 248 may employ one or more supervised, unsupervised, or self-supervised machine learning models. Generally, supervised learning entails the use of a training set of data that is used to train the model to apply labels to the input data. For example, the training data may include sample video data depicting a particular event that has been labeled as such. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Self-supervised learning models take a middle ground approach that uses a greatly reduced set of labeled training data.

Example machine learning techniques that video analytics process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

In further implementations, video analytics process 248 may also include one or more generative artificial intelligence/machine learning models. In contrast to discriminative models that simply seek to perform pattern matching for purposes such as object identification, etc., generative approaches instead seek to generate new content or other data (e.g., audio, video/images, text, etc.), based on an existing body of training data. For instance, in the context of video analytics, video analytics process 248 may use a generative model to generate summaries of events depicted in video, make suggestions based on those events, etc. Example generative approaches can include, but are not limited to, generative adversarial networks (GANs), large language models (LLMs), other transformer models, and the like.

FIG. 3 illustrates an example system 300 for performing video analytics, as described in greater detail above. As shown, there may be any number of cameras 302 deployed to a physical area, such as cameras 302a-302b. Such surveillance is now fairly ubiquitous across various locations including, but not limited to, public transportation facilities (e.g., train stations, bus stations, airports, etc.), entertainment facilities (e.g., sports arenas, casinos, theaters, etc.), schools, office buildings, and the like. In addition, so-called "smart" cities are also now deploying surveillance systems for purposes of monitoring vehicular traffic, crime, and other public safety events.

Regardless of the deployment location, cameras 302a-302b may generate and send video data 308a-308b, respectively, to an analytics device 306 (e.g., a device 200 executing video analytics process 248 in FIG. 2). For instance, analytics device 306 may be an edge device (e.g., an edge device 122 in FIG. 1), a remote server (e.g., a server 116 in FIG. 1), or may even take the form of a particular endpoint in the network, such as a dedicated analytics device, a particular camera 302, or the lie.

In general, analytics device 306 may be configured to provide video data 308a-308b for display to one or more user interfaces 310, as well as to analyze the video data for events that may be of interest to a potential user. To this end, analytics device 306 may perform object detection on video data 308a-308b, to detect and track any number of objects 304 present in the physical area and depicted in the video data 308a-308b. In some implementations, analytics device 306 may also perform object re-identification on video data 308a-308b, allowing it to recognize an object 304 in video data 308a as being the same object in video data 308b or vice-versa.

As noted above, the amount of images/video data being generated, stored, and analyzed by system 300 and similar video analytics systems is increasing at a meteoric rate. This means an increased use of resources ranging from storage resources, computational resources, as well as network resources. For instance, in the case in which analytics device 306 is a remote server, such as one located in the cloud, this means that video data 308a-308b will need to be sent across the Internet, consuming additional bandwidth.

While using an existing compression standard can help to reduce the size of the image/video files, thereby reducing the required resources, these standards all seek to minimize the size of the file while maximizing the visual quality (e.g., JPEG, PNG, TIFF, etc.). This is also true for machine learning-based compression approaches which typically seek to maximize the quality of the decompressed image from the standpoint of a user, for purposes of producing a decompressed image that is as visually similar to that of the original as possible.

However, one observation herein is that video analytics systems assess the actual data in an image file (e.g., its pixel information, hidden metadata, etc.), without regard for how the image would look to a user. Thus, from a machine learning standpoint, the data stripped out of the image file when compressed using traditional compression techniques may actually be the most important to a machine learning-based analytics model that assesses that image.

Image Analytics Using Embeddings

The techniques herein address the above propose using embeddings to represent (compressed) images. In various implementations, this approach leverages: 1.) an encoder that is trained to maximize the data utility of the embedding to an analytics model and 2.) an output dimension that is arbitrarily constrained. In further aspects, the techniques herein also introduce a user interface that allows a user to control how images are transformed into the embeddings for use to train an analytics model. As would be appreciated, the embeddings may be optimally compressed using the techniques herein and do not need to be decompressed prior to analysis by an analytics model. In addition, as they are smaller than traditional image files, this also saves on the consumed resources by the analytics system.

Illustratively, the techniques described herein may be performed by hardware, software, and/or firmware, such as in accordance with the video analytics process 248, which may include computer executable instructions executed by the processor 220 (or independent processor of interfaces 210), to perform functions relating to the techniques described herein.

Specifically, according to various implementations, a device receives, via a user interface, one or more parameters regarding formation of an embedding of an image. The device forms, in accordance with the one or more parameters, an embedding of the image by inputting it to a machine learning-based encoder model that was trained to maximize a measure of data utility of its output embeddings. The device provides the embedding for use to train an analytics model. The device causes the analytics model to be used to make inferences about embeddings derived from images captured by one or more cameras.

Figure 4:
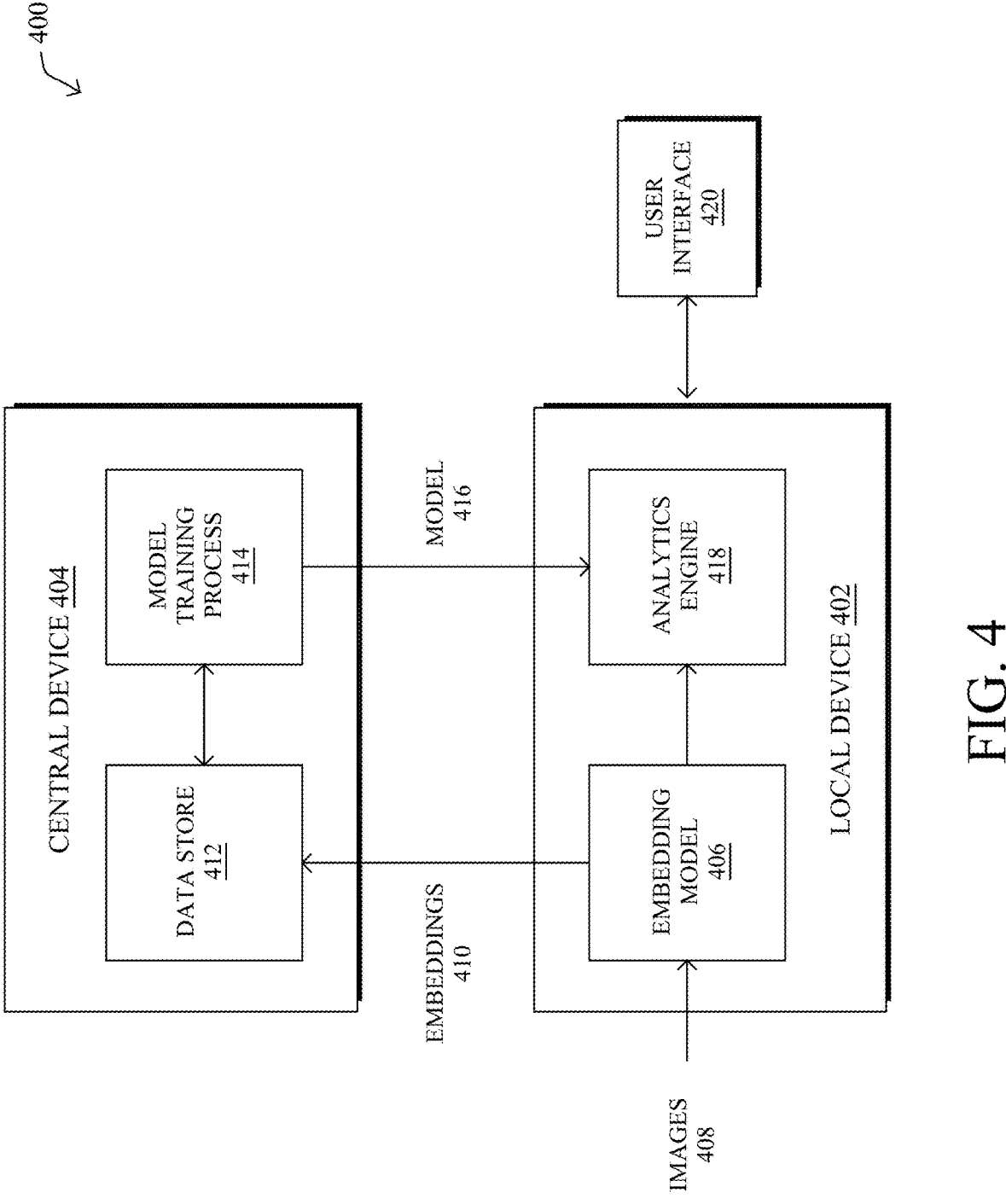
FIG. 4 illustrates an example architecture for image analysis using embeddings.

Operationally, in various implementations, FIG. 4 illustrates an example architecture 400 for image analysis using embeddings, in various implementations. As shown, assume that there are multiple devices in communication with one another via a network, such as a local device 402 and a central device 404, which may be located in the cloud, a data center, or other location that is remote from that of local device 402. During use, local device 402 and central device 404 may each execute at least a portion of video analytics process 248, which may take the form of various software components such as an embedding model 406, a data store 412, a model training process 414, and/or an analysis engine 418.

As would be appreciated, while architecture 400 shows these components being executed by specific devices (e.g., devices 402-404), these components may be executed according to different configurations without deviating from the techniques herein (e.g., central device 404 executing analytics engine 418 instead of local device 402, one or more other devices execute at least one of the components, etc.). In addition, in implementations in which the components are executed in a distributed manner, the executing devices may also be viewed as a singular device for purposes of the disclosure herein.

During operation, local device 402 may receive images 408 either directly or indirectly from a camera. For instance, local device 402 may take the form of an edge device in communication with one or more cameras that provide video feed data to local device 402, either directly or indirectly, that include images 408. In turn, local device 402 may apply an embedding model 406 to images 408, to generate embeddings 410. In general, an embedding of an image takes the form of a numerical/vector representation of the data contained in that image. To this end, embedding model 406 may take the form of a trained neural network or other suitable form of machine learning model that process the image through a series of neural network layers, thereby forming an embedding that represents the image.

As would be appreciated, even embedding-based image compression mechanisms typically focus on maximizing the data in a given image for purposes of decompressing the image with the least amount of loss to the look of the image from the standpoint of a user. In contrast, though, the techniques herein note that doing so is often non-optimal for the purpose of using an analytics model to make an inference about the image, since the most useful information to the analytics model is often stripped during the compression process.

Accordingly, in various implementations, embedding model 406 may be specifically trained to maximize the data utility within embeddings 410 for a specific type of image analytics inference or set of such tasks. In order to ensure that embeddings 410 are smaller in size than that of images 408, embedding model 406 may also limit embeddings 410 to a maximum size, number of features, and/or number of bits for a given feature. Note also that while embedding model 406 is shown as a singular model, it may include multiple embedding models, as needed.

In some implementations, a user may control the embedding mechanism by interacting with a user interface 420, to specify one or more parameters regarding the formation of embeddings 410. By way of example, FIG. 5 illustrates an example user interface 500 to control how an embedding is formed from an image.

As shown in FIG. 5, a user operating user interface 500 may specify one or more model parameters 502 such as any or all of the following:

An inference model among those available to train and/or use

A precision—how many bits each feature uses (e.g., float16, float32, etc.)

An embedding size—e.g., how many features are desired. Note that a model with few features does not merely output a subset of features of another model; the two feature sets are found with different models.

A parameter that controls whether default weights are used or chosen from another file or other source In addition, as shown, the user may also specify any of the target parameters 504 such as:

A target data type for the embeddings—for instance, pickle, .csv, .txt, .json, etc.

Whether the output embeddings should also be compressed (e.g., using ZIP)

Whether the folders/file structure should be preserved

Whether one file should be included per directory

User interface 500 may also include controls 508 that allow the user to specify which image or set of images are to be converted into embeddings, as well as their location(s), and to start/stop the conversion. For instance, the source location could be a database, a file, several files, a folder, a zip file, a stream, or the like, which may be displayed in portion 506 of user interface 500. Similarly, the user may also be able to specify the target destination for the embeddings, be it a stream, a database, a hard drive, a file system location, a cloud location, or the like.

Another aspect of user interface 500 is portion 510, which displays indicia regarding the progress of the embedding generation, such as the data fetch, encoding, and/or data deliver tasks.

Referring again to FIG. 4, embedding model 406 may then provide its embeddings 410 to a data store 412, such as a cloud-hosted location on central device 404 or the like. Of course, data store 412 could also be stored on-premise, as desired. In some instances, the user of user interface 420 may also be able to specify the permissions surrounding embeddings 410, as well, such as by granting access only internally within a given organization, publicly as part of a paid service, or the like.

Using the embeddings 410 in data store 412 as training data, model training process 414 may then train a machine learning model 416 to perform any number of analytics/inference tasks. For instance, assume that model 416 is to analyze a video feed of a busy area for purposes of counting people. In such a case, the presence of vehicles, pets or other animals, etc. in the images of the video may be irrelevant or greatly reduced, meaning that their corresponding features can be excluded partially or even entirely, in some instances, when forming embeddings 410. Similarly, perhaps the depiction of each person's face may be highly critical for purposes of facial recognition, but not important at all for purposes of person counting. Thus, the measure of data utility used to form embeddings 410 may be dependent on the intended use of that data later on, presenting the opportunity to 'compress' the images 408 by excluding or otherwise deemphasizing those features that are unimportant to the inference task.

Once machine learning model 416 has been trained, model training process 414 may deploy it to a target location for execution. For simplicity, assume that local device 402 then receives machine learning model 416 for use by its analysis engine 418. Since model training process 414 trained machine learning model 416 using embeddings 410 and not the source images 408 themselves, the inputs to analysis engine 418 can themselves be embeddings, which allows it to make quicker inferences and with lower resource consumptions.

Figure 6:
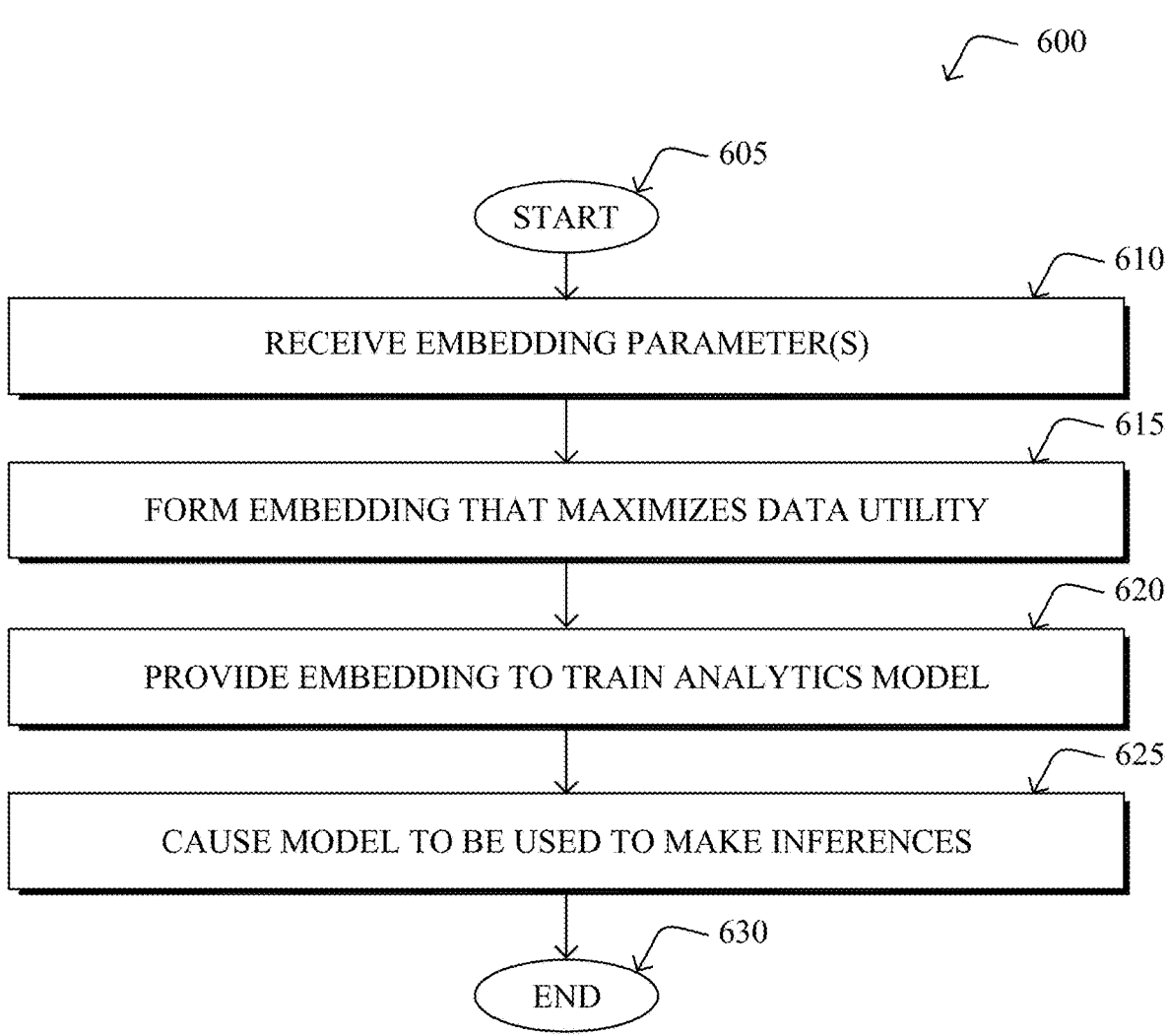
FIG. 6 illustrates an example simplified procedure for image analysis using embeddings.

FIG. 6 illustrates an example simplified procedure 600 (e.g., a method) for image analysis using embeddings, in accordance with one or more implementations described herein. For example, a non-generic, specifically configured device (e.g., device 200), such as an edge device, a server, or other device in a network, may perform procedure 600 by executing stored instructions (e.g., video analytics process 248). The procedure 600 may start at step 605, and continues to step 610, where, as described in greater detail above, the device may receive, via a user interface, one or more parameters regarding formation of an embedding of an image. In some implementations, the one or more parameters specify a file type for the embedding of the image. In another implementation, the one or more parameters specify a location of the image. In a further implementation, the one or more parameters specify a number of bits for each feature of the image represented in the embedding. In another implementation, the one or more parameters specify a maximum size of the embedding and a maximum number of features of the image represented in the embedding.

At step 615, as detailed above, the device may form, in accordance with the one or more parameters, an embedding of the image by inputting it to a machine learning-based encoder model that was trained to maximize a measure of data utility of its output embeddings. In various implementations, the machine learning-based encoder model maximizes the measure of data utility based on a type of the analytics model indicated by the one or more parameters.

At step 620, the device may provide the embedding for use to train an analytics model, as described in greater detail above.

At step 625, as detailed above, the device may cause the analytics model to be used to make inferences about embeddings derived from images captured by one or more cameras. In some embodiments, this may entail using embeddings formed by the machine learning-based encoder model as input to the analytics model. In various implementations, the inferences by the analytics model comprise identification of a particular type of object depicted in the images from which the embeddings were derived.

In one implementation, the images are from a video feed from one or more cameras.

Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the implementations herein.

While there have been shown and described illustrative implementations that provide for image analytics using embeddings, it is to be understood that various other adaptations and modifications may be made within the spirit and scope of the implementations herein. For example, while certain implementations are described herein with respect to specific use cases for the techniques herein, the techniques can be extended without undue experimentation to other use cases, as well.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof, that cause a device to perform the techniques herein. Accordingly, this description is to be taken only by way of example and not to otherwise limit the scope of the implementations herein. Therefore, it is the object of the appended claims to cover all such variations and modifications as come within the true spirit and scope of the implementations herein.

What is claimed is:

1. A method comprising:
   receiving, at a device and via a user interface, one or more parameters regarding formation of an embedding of an image, wherein the one or more parameters specify a number of bits for each feature of the image represented in the embedding;
   forming, by the device and in accordance with the one or more parameters, an embedding of the image by inputting it to a machine learning-based encoder model that was trained to maximize a measure of data utility of its output embeddings;
   providing, by the device, the embedding for use to train an analytics model; and causing, by the device, the analytics model to be used to make inferences about embeddings derived from images captured by one or more cameras.

2. The method as in claim 1, wherein the one or more parameters specify a file type for the embedding of the image.

3. The method as in claim 1, wherein the one or more parameters specify a location of the image.

4. The method as in claim 1, wherein the machine learning-based encoder model maximizes the measure of data utility based on a type of the analytics model indicated by the one or more parameters.

5. The method as in claim 1, wherein the one or more parameters specify a maximum size of the embedding and a maximum number of features of the image represented in the embedding.

6. The method as in claim 1, further comprising:
using embeddings formed by the machine learning-based encoder model as input to the analytics model.

7. The method as in claim 1, wherein the inferences by the analytics model comprise identification of a particular type of object depicted in the images from which the embeddings were derived.

8. The method as in claim 7, wherein the images are from a video feed from one or more cameras.

9. The method as in claim 1, wherein the device is an edge device in a network.

10. An apparatus, comprising:
a network interface to communicate with a computer network;
a processor coupled to the network interface and configured to execute one or more processes; and
a memory configured to store a process that is executed by the processor, the process when executed configured to:
receive, via a user interface, one or more parameters regarding formation of an embedding of an image, wherein the one or more parameters specify a number of bits for each feature of the image represented in the embedding;
form, in accordance with the one or more parameters, an embedding of the image by inputting it to a machine learning-based encoder model that was trained to maximize a measure of data utility of its output embeddings;
provide the embedding for use to train an analytics model; and
cause the analytics model to be used to make inferences about embeddings derived from images captured by one or more cameras.

11. The apparatus as in claim 10, wherein the one or more parameters specify a file type for the embedding of the image.

12. The apparatus as in claim 10, wherein the one or more parameters specify a location of the image.

13. The apparatus as in claim 10, wherein the machine learning-based encoder model maximizes the measure of data utility based on a type of the analytics model indicated by the one or more parameters.

14. The apparatus as in claim 10, wherein the one or more parameters specify a maximum size of the embedding and a maximum number of features of the image represented in the embedding.

15. The apparatus as in claim 10, wherein the process when executed is further configured to:
use embeddings formed by the machine learning-based encoder model as input to the analytics model.

16. The apparatus as in claim 10, wherein the inferences by the analytics model comprise identification of a particular type of object depicted in the images from which the embeddings were derived.

17. The apparatus as in claim 16, wherein the images are from a video feed from one or more cameras.

18. A tangible, non-transitory, computer-readable medium storing program instructions that cause a device to execute a process comprising:
receiving, at a device and via a user interface, one or more parameters regarding formation of an embedding of an image, wherein the one or more parameters specify a number of bits for each feature of the image represented in the embedding;
forming, by the device and in accordance with the one or more parameters, an embedding of the image by inputting it to a machine learning-based encoder model that was trained to maximize a measure of data utility of its output embeddings;
providing, by the device, the embedding for use to train an analytics model; and
causing, by the device, the analytics model to be used to make inferences about embeddings derived from images captured by one or more cameras.

19. The method as in claim 1, wherein the analytics model is trained to perform inference directly on the embedding without reconstructing the image from the embedding.

20. The method as in claim 1, wherein the machine learning-based encoder model was trained to maximize the measure of data utility by optimizing performance of a reference analytics model on embeddings generated by the machine learning-based encoder model during training.

* * * * *